June 24, 1941.  H. GRIFFIN  2,246,583
HEAT SHIELD FOR MOTION PICTURE PROJECTORS
Filed Dec. 31, 1938
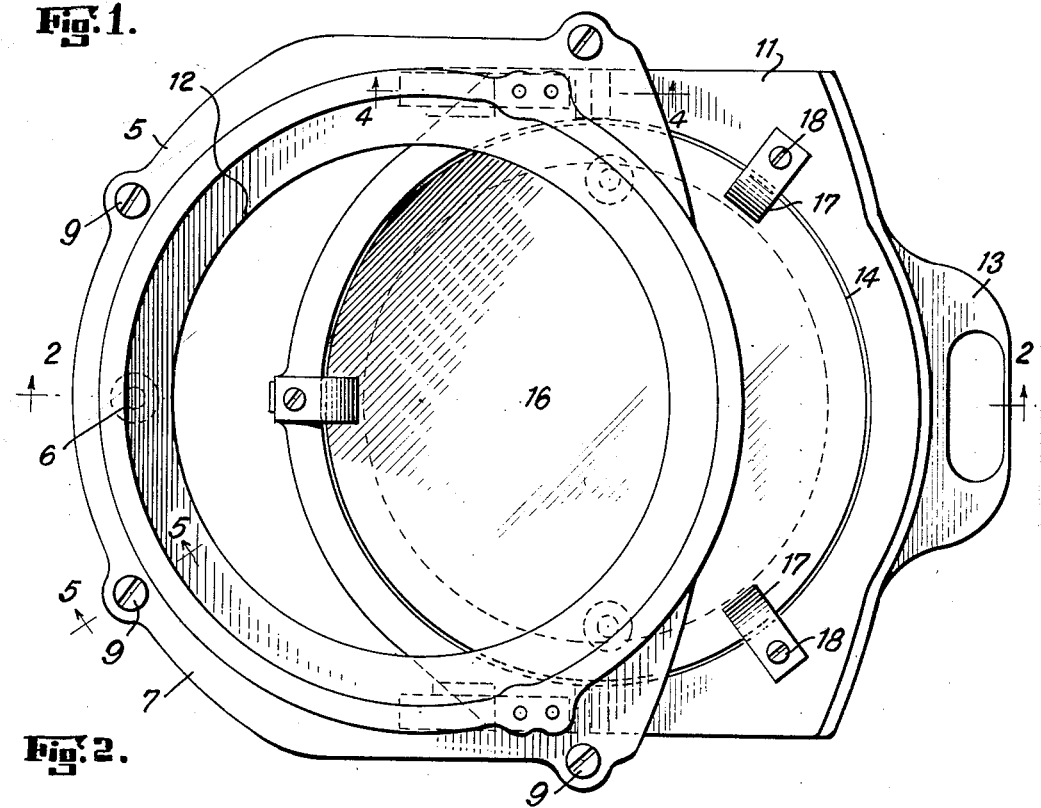
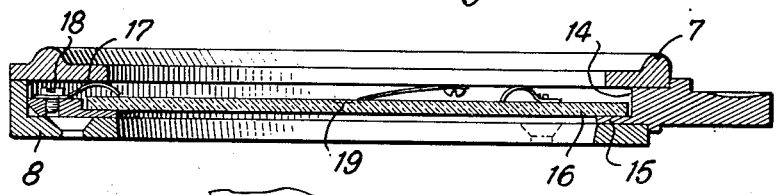
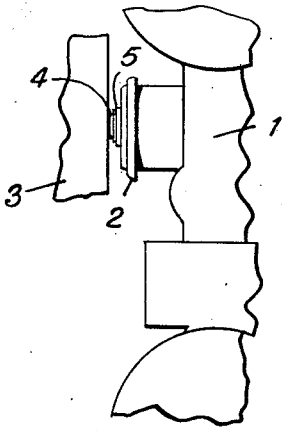
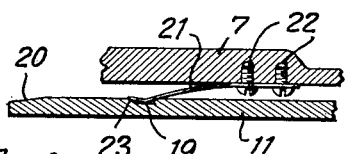
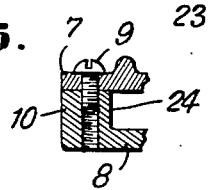
INVENTOR.
Herbert Griffin
BY Hastings W. Baker
ATTORNEY Patented June 24, 1941

2,246,583

UNITED STATES PATENT OFFICE 2,246,583

HEAT SHIELD FOR MOTION PICTURE PROJECTORS

Herbert Griffin, Jersey City, N. J., assignor to International Projector Corporation, New York, N. Y., a corporation of Delaware Application December 31, 1938, Serial No. 248,674

7 Claims. (Cl. 88—24)

As is well known in the art, a motion picture projector is placed in front of the lamphouse and the light from the lamphouse passes through the film in the projector and is thrown on a screen where it is viewed by the audience. Most of the lamps are high intensity flaming arc lights which give off an intense heat. In the past it has been customary to place the conventional motion picture shutter in front of the projector, but recent developments have shown marked advantages in providing a rear shutter, that is, a revolving shutter between the film gate in the projector and the lamphouse. It is found that when this rear shutter is employed, the illumination is greatly improved. By this means increased heat on the film passing through the film gate and the rotation of the rear shutter may create air currents which might effect the flame of the arc lamp. It is desirable to prevent any disturbing currents of air from causing the flame to waver. It is, of course, highly desirable to maintain the flame uniform. The object of this invention is to prevent any disturbance of the arc lamp by air currents when a rear shutter is employed.

Another object of the invention is to reduce the temperature at the aperture plate. I find that by using a 65 ampere lamp with a rear shutter running, the temperature reduction at the aperture plate is in the order of 900 degrees Fahrenheit and with the addition of the shield shown in this application, a still further reduction of approximately 200 degrees is obtained.

Another object of the invention is to provide a shield which will greatly improve the quality of the projected picture and at the same time to provide a noticeable improvement in illumination.

Another object of the invention is to minimize the noise in the projection room from the movement of the air caused by the rotation of the shutter.

Another object of the invention is to prevent carbon and carbon dust from the lamphouse entering the projector and thus eliminate its well-known disadvantages.

The invention may be better understood by referring to the attached drawing in which:

Fig. 1 is a rear elevational view of my improved shield,

Fig. 2 is a cross-sectional view thereof taken on substantially the line 2—2 of Fig. 1 looking upwardly or in the direction of the arrows and showing the shield in its position, Fig. 3 is a side elevational view of a fragment of a projector and a lamphouse showing the location of my shield in respect to the position of the lamphouse and the projector, Fig. 4 is a cross sectional view on the line 4—4 of Fig. 1 looking upwardly or in the direction of the arrows, and Fig. 5 is a fragmentary cross-sectional view on the line 5—5 of Fig. 1.

The projector 1 is indicated in outline in Fig. 3 and is provided with a rear shutter housing 2 in which the conventional rear shutter rotates. The lamphouse 3 is placed behind the projector and is provided with a snout 4 which is closely adjacent or extends slightly within the shield housing 5 which is attached by means of screws 6 to the rear shutter housing 2.

The shield housing 5 consists of a front plate 8 and a rear plate 7 attached together by means of screws 9. These plates are substantially of the shape shown in Fig. 1 when looking at the face thereof and as shown in Fig. 5 the front plate 8 is provided with a flange 10 extending toward the plate 7 so as to space these two plates apart so that the insertable shield holder 11 can be inserted between the front and rear plate. The front and rear plates are each provided with a circular central aperture 12. It will be understood that the light from the lamphouse passes through this aperture 12 and thence passes through the projector. By rear, I mean nearest to the lamphouse and by front, I mean nearest to the projector.

The insertable shield holder 11 is provided with a hand piece 13 and a centrally disposed aperture. It is also provided with a circular flange 15. An optically flat, clear heat resisting material, hereinafter called a shield, 16 is placed in the aperture 14 against the flange 15 and thereafter spring arms 17 are secured to the shield holder 11 by means of screws 18, the spring arms 17 overlying the shield 16 and serving to hold it in place against the flange. I have found Pyrex to be suitable as the heat resisting material although, obviously, other substances might be employed.

The shield holder 11 is provided with diametrically opposite depressions 19 and to the left of the depressions are cam surfaces 20. Leaf springs 21 are secured to the rear plate 7 by means of screws 22. When the shield holder 11 is fully inserted as shown in Fig. 2, the ends of the springs 21 enter the depressions 19 and hold the shield holder in place. The shield holder 11 is provided with the cam surface 23 at the left hand portion of the depressions 19 as viewed in Fig. 4 so that if the operator desires to remove the shield holder, the springs 21 will slide out of the depressions 19 on the cam surfaces 23. When the shield holder has been entirely removed from the shield housing, it can be reinserted and the cam surfaces 20 serve as a means to push the springs 21 toward the rear plate 7 so that the shield holder may be inserted. The inner surfaces 24 of the flanges 10 of the front plate 8 will, of course, serve as a trackway for the shield holder 11 at the top and bottom thereof when the shield holder is being inserted or removed.

It is, therefore, obvious that I have provided a removable optically flat, clear heat resisting material in the projector and have so positioned it that the light from the lamphouse will have to pass through the shield before reaching the film. When the rear shutter in the shutter housing 2 rotates the current set up cannot pass rearwardly through the shield into the lamphouse and thereby disturb the arc which would interfere with the projection of a perfect picture. The arc is, therefore, maintained at its highest efficiency and the rotation of the rear shutter in no wise interferes with its efficiency. Furthermore, the shield prevents the extremely hot gases from the lamp house passing into the projector. An actual experience has shown that this shield causes a reduction in temperature at the aperture plate in the projector of approximately 200 degrees. By eliminating the objectionable currents of air passing into the lamphouse and by eliminating the hot gases from the lamphouse passing into the projector the illumination is greatly improved as is the quality of the projector picture. The shield also minimizes the noise which might otherwise pass into the projection room from the movement of the rear shutter and the air currents created thereby. It is also obvious that since the air currents from the lamphouse cannot pass into the projector, the carbon and carbon dust from the lamphouse are also excluded so that the various mechanisms in the projector are protected against these foreign substances which may come from the lamphouse. It is also obvious that since the temperature in the projector is greatly reduced when my shield is employed, damage to film through distortion and buckling caused by intensive heat will, to a large extent, be eliminated.

I wish it to be understood that I do not desire to be limited to the exact details of construction shown and described for, obviously, modifications will occur to a person skilled in the art.

Having now described my invention, I claim:

1. In combination with a motion picture projector to be used with a light source, a shield housing forming a part of said projector, trackways in said shield housing, a holder slidable in said trackways, a transparent material supported by said holder and through which the beam of light passes from the light source, through the rear shutter housing and into the projector, said holder being provided with notches and springs carried by the housing adapted to snap into said notches to lock the holder in position when fully inserted in the housing.

2. In combination with a motion picture projector to be used with a light source, a rear shutter housing forming a part of said projector, a shield housing carried by said shutter housing and a transparent shield adapted to be inserted in said housing so that the beam of light from the light source will pass through said shield and thence into the projector and latching means to latch the shield in the shield housing when the shield is fully inserted in the shield housing.

3. In combination with a motion picture projector to be used with a light source, a rear shutter housing forming a part of said projector, a shield housing carried by said shutter housing, a shield holder provided with an aperture, said shield holder being adapted to be removably inserted in the shield housing and a transparent material mounted in said shield holder so as to cover said aperture and so that the beam of light will pass from the light source into the projector.

4. In combination with a motion picure projector to be used with a light source, a rear shutter housing forming a part of said projector, a shield housing carried by said shutter housing, a shield holder provided with an aperture, said shield holder being adapted to be removably inserted in the shield housing, a transparent material mounted in said shield holder so as to cover said aperture and so that the beam of light will pass from the light source into the projector, and means to hold said shield holder in said shield housing when the holder is fully inserted in the housing.

5. In combination with a motion picture projector to be used with a light source, a rear shutter housing forming a part of said projector, a shield housing carried by said shutter housing, a shield holder provided with an aperture, said shield holder being adapted to be removably inserted in the shield housing, a transparent material mounted in said shield holder so as to cover said aperture and so that the beam of light will pass from the light source into the projector, and a hand piece whereby the holder may be removed from the housing.

6. In combination with a motion picture projector to be used with a light source, a rear shutter housing forming a part of said projector, a housing for a shield carried by said shutter housing, a shield of transparent material adapted to be inserted in said shield housing so that the beam of light from the light source will pass from said shield and then into the projector, said shield housing being provided with trackways to guide the shield when the same is being inserted or removed from the housing.

7. In combination with a motion picture projector to be used with a light source, a rear shutter housing forming a part of said projector, a shield housing carried by said shutter housing, trackways in said shield housing, a shield of transparent material adapted to be inserted in said shield housing on said trackways so that the beam of light from the light source will pass from said shield through the projector, and resilient means to hold said shield in said shield housing when the shield has been fully inserted in the shield housing.

HERBERT GRIFFIN.